March 30, 1926.
M. HASTINGS
MOWING MACHINE
Filed Jan. 11, 1924
1,578,728
2 Sheets-Sheet 1
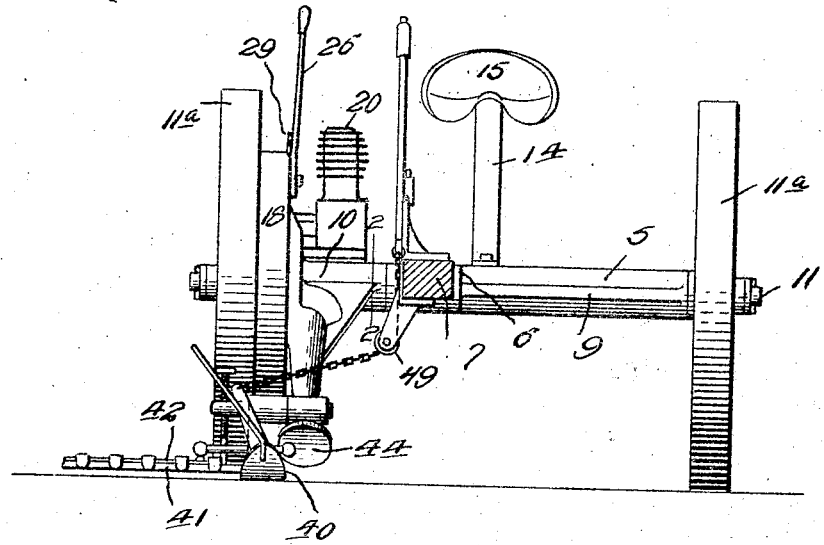
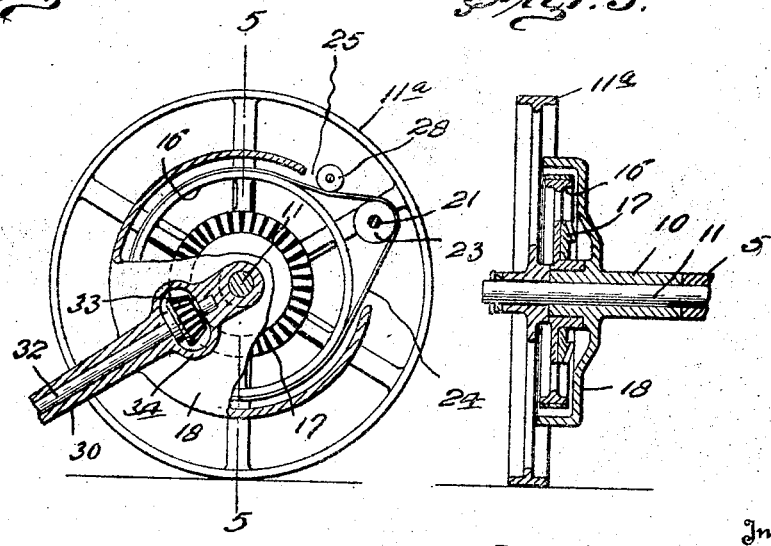
Witness.
F. C. Gibson.
Inventor
Mark Hastings,
By Clarence A. O'Brien
Attorney March 30, 1926.
M. HASTINGS
MOWING MACHINE
Filed Jan. 11, 1924    2 Sheets-Sheet 2
1,578,728
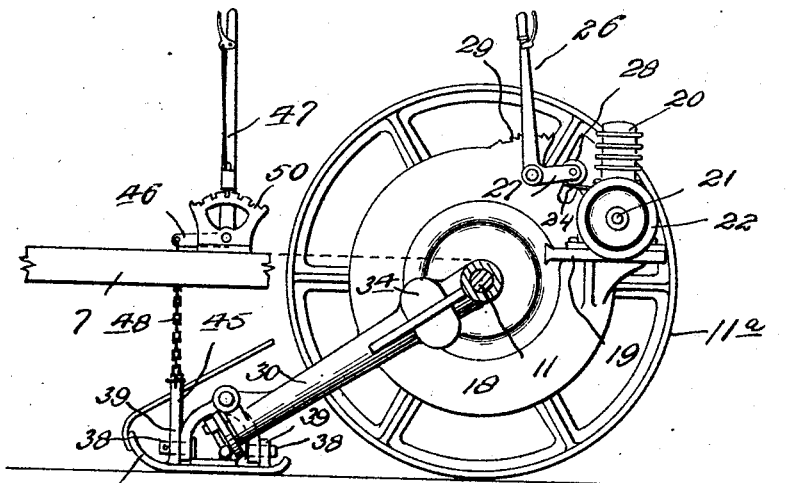
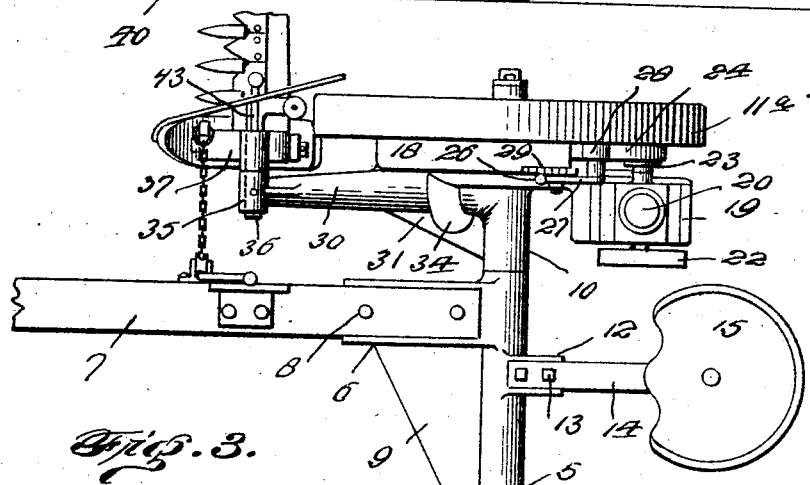
Inventor
Mark Hastings.

Patented Mar. 30, 1926.

1,578,728

UNITED STATES PATENT OFFICE.

MARK HASTINGS, OF RIDGEFIELD, CONNECTICUT.

MOWING MACHINE.

Application filed January 11, 1924. Serial No. 685,681.

*To all whom it may concern:*

Be it known that I, MARK HASTINGS, subject of the King of Great Britain, residing at Ridgefield, in the county of Fairfield and State of Connecticut, have invented certain new and useful Improvements in Mowing Machines, of which the following is a specification.

This invention relates to the art of harvesters and has particular reference to an improved mowing machine adapted to be drawn over the field by draft animals or the like, and characterized by the provision of motor operated cutting mechanism so that the draft animals are only required to cause the travelling movement of the machine and are thereby relieved of exerting power for causing operation of the cutting mechanism.

An object of the invention is to provide a mowing machine of the above kind that includes a cutting mechanism in which a reciprocating cutter bar is embodied and wherein the driving connection between the operating motor and the cutting bar includes a relatively short pitman whose length and position insures against the same becoming readily damaged or broken in the use of the machine.

In prior mowing machines with which I am familiar, the draft animals are subjected to arduous labor due to the fact that the cutting mechanism is driven from the traction or supporting wheels of the machine necessitating the expenditure of power of the draft animals not only for the forward travelling movement of the machine but for the operation of the cutting mechanism. Such prior machines also embody a relatively long pitman rod forming part of the operative connection between the traction wheels and the cutter bar and extending substantially or entirely across the machine in such position and necessarily of such form and length as to be readily damaged or broken by striking against firmly embedded obstructions such as stumps, stones, etc. A further objection with this prior type of machine is that it is necessary to cause the same to travel forwardly at a predetermined rate of speed in order to prevent clogging of the cutting mechanism and operating gearing therefor and in order to cause sufficiently fast reciprocation of the cutter bar to insure its effective cutting operation. When the forward travel of the machine is effected to this speed, it is practically impossible for the operator to determine whether or not he is approaching an obstruction that is likely to cause damage to the parts of the machine such as the above mentioned pitman rod, and the inevitable result is the rendering of the machine inoperative and costly and time consuming necessary repairs. An object of the present invention is, therefore, to provide a mowing machine which will be free of the above noted objections, the cutting mechanism operating at the same uniform speed at all times irrespective of the speed of forward travel of the machine, no exertion being necessary on the part of the draft animals for causing operation of the cutting mechanism, and the operative connection to the cutter bar embodying a relatively short pitman disposed so as to be protected and less likely to be engaged with obstructions. The machine may be drawn forwardly at a comparatively slow rate of speed without affecting the operation of the cutting mechanism or reducing its speed of operation so as to be defective in operation, and thereby enabling the operator to determine the approach to an obstruction so that the cutting mechanism may be lifted clear of the same in such manner as to leave a minimum amount of unmowed area.

A still further object is to provide a mowing machine of generally simplified and improved form, and one that may be manufactured and marketed at a relatively low cost to present a structure that is durable and efficient in operation.

Other objects will become apparent as the nature of the invention is better understood, and the same consists in the novel form, combination, and arrangement of parts hereinafter more fully described, shown in the accompanying drawings, and claimed.

Figure 1 is a front elevational view, partly broken away and partly in section, of a mowing machine constructed in accordance with the present invention.

Figure 2 is a substantially central longitudinal sectional view thereof taken upon the line 2—2 of Figure 1.

Figure 3 is a top plan view of the device shown in Figure 1.

Figure 4 is a fragmentary view partly in longitudinal section and partly in side elevation, of the device shown in Figure 1.

Figure 5 is a vertical transverse section taken on the line 5—5 of Figure 4.

Referring more in detail to the drawing, the present invention embodies a frame or supporting structure composed of a relatively long tubular section 5 that is formed adjacent its inner end with a rigid longitudinal forwardly projecting arm 6, that is preferably of channel form for the reception of the rear end of an ordinary draft tongue 7, adapted to be equipped with any suitable means for facilitating hitching of draft animals thereto and that is attached to the arm 6 in a rigid manner by bolting or the like as at 8, the arm 6 being spaced with respect to the member 5 by means of a substantially triangular web between these parts as at 9. The frame or supporting structure embodies another relatively short tubular member 10, and extending through the tubular members 5 and 10 is a transverse axle 11, the ends of which project beyond the outer ends of the members 5 and 10 and have suitable supporting wheels 11 journalled and suitably retained thereon. The tubular member 5 is provided with a rearwardly projecting arm 12 substantially midway between the wheels 11, and to which the lower end of the usual seat supporting spring employed in agricultural implements is secured by bolting or otherwise, as at 13, said spring being indicated at 14 and carrying upon its upper end the seat 15, and the arm 12 being preferably of channel form to receive the lower end of the seat supporting spring 14 as shown more clearly in Figure 3.

Rotatably mounted upon the outer end of the member 10 is a relatively large belt pulley 16 at the inner side of which is a relatively smaller bevelled gear 17 that is also concentric with and rigid with said pulley 16. The pulley 16 and gear 17 are thus rotatably mounted at the inner side of the adjacent supporting wheel 11$^a$ and a pan shaped gear casing 18 is rigid with the member 10 and disposed about the pulley 16 and gear 17 so as to protect the latter in an obvious manner. A suitable platform 19 is provided rigid with the gear casing 18 preferably rearwardly of the axle 11 and on a higher plane than the latter and suitably mounted on this platform 19 is a small motor 20 that may be of the internal combustion type as shown and that includes a power shaft 21 upon the inner end of which is mounted a fly wheel 22 and upon the outer end of which is fixed a pulley 23 as that shown in Figures 2 and 4, the pulley 23 being in alignment with and rearwardly of the pulley 16 and operatively connected to the latter by means of a belt 24 passing about said pulleys. The rim of the gear casing 18 is of course cut away so as to permit passage of the belt 24 therethrough and in order to maintain the belt 24 tight, a hand lever 26 is pivoted to the inner side of the casing 18 and has a rigid arm 27 projecting rearwardly from its lower pivoted end, the arm 27 being equipped with an idler roller 28 disposed upon the belt 24, and the gear casing 18 being formed with a rack segment 29 for cooperation with the usual latch of the lever 26 for maintaining it adjusted. It is thus apparent that rearward swinging movement of the lever 26 may be accomplished from the seat 15 for causing tightening of the belt 24, which tight condition of the belt is maintained by reason of the engagement of the latch of the lever 26 with the segment 29.

Rigid with and projecting forwardly and downwardly from the tubular member 10 and its gear casing 18 is a tubular arm 30, that terminates adjacent the ground and at a point slightly in advance of the adjacent ground engaging or supporting wheel 11$^a$, the arm 30 being braced relative to the member 10 by means of a web 31 connecting these parts at their point of juncture. Journalled in the arms 30 is a driven shaft 32, upon the rear end of which is secured a bevelled gear 33, that meshes with the gear 17, and that is arranged within an enlargement of the arm 30 that forms a gear casing indicated at 34. The lower end of the arm 30 is provided upon its upper side with a transverse rigid sleeve 35 in which is secured a transversely and outwardly extending stub shaft 36, and upon the outer end of this shaft is suspended a yoke 37, the lower end of which is pivoted at 38 upon longitudinal aligned axes to ears 39 that are rigid with and project upwardly from the inner one of a pair of spaced ground engaging shoes or runners 40. The shoes 40 are connected by a toothed elongated guard plate 41 of well known form, upon which is slidably disposed the usual transversely extending reciprocable cutter bar 42, and as shown clearly in the several views, the cutter bar and guard plate form cutting elements of the cutting mechanism that extend outwardly from the arm 30 directly in front of the adjacent supporting wheel 11$^a$. As the cutter bar 42 terminates adjacent the lower end of the arm 30 and as the arm 30 is disposed adjacent and at the inner side of the aforesaid supporting wheel 11$^a$, no relatively long pitman is required for operatively connecting the cutter bar to the lower end of the shaft 32. A relatively short pitman 43 is therefore utilized to connect the inner end of the cutter bar 42 with a crank element or disc 44 that is fixed upon the lower end of the driven shaft 32 as shown clearly in the several views, which pitman is shielded by the inner shoe 40 and disposed directly in front of the adjacent supporting wheel 11ª, so that the same is not subjected to serious damage from obstructions.

The forward ear 39 is provided with a rigid upwardly and outwardly extending arm 45, and this arm is operatively connected with an arm 46 that is rigid with the lower pivoted end of a longitudinally swinging hand lever 47 by any suitable means such as a flexible element or chain 48 that passes around a suitable guide as at 49, the hand lever 47 being mounted upon the rear end of the draft tongue 7, and having a conventional form of latch cooperating with a notched segment 50 for a well known purpose. Any suitable means may be provided for bracing the guard plate 41 and the cutter bar 42 against forward or rearward strain.

In operation, the motor 20 is started, and due to the fact that pulleys 16 and gear 17 are rotatable upon the member 10 relative to the axle 11 and the adjacent supporting wheel 11ª, the cutter bar 42 will be reciprocated at a uniform speed through the gearing and pitman described, and irrespective of whether or not the machine is drawn forwardly or at what speed of movement the machine is caused to travel. The draft animals or tractor hitched to the tongue 7 may be caused to draw the machine forwardly at any desired rate of speed without rendering the cutting mechanism ineffective, and by reason of that fact, a slow travel of the machine may be caused, so that the operator may have ample time to note approach to obstructions when mowing over rough ground or ground filled with obstructions. This will give the driver sufficient time to lift the cutting mechanism by tilting the same laterally about the pivots 38 through the medium of a rearward swinging movement of the lever 47. In some instances, the obstructions may be cleared by simply deviating slightly from the original course of the machine in its travel so as to let the obstruction pass at the inner side of the arm 30. This will prevent striking of the pitman 23 without leaving an unduly large unmowed area, and this could not be accomplished by prior machines employing pitmans that extend entirely across the machine from one supporting wheel to the other. Otherwise, the operation of the machine is substantially the same as that of prior devices of this kind. It is therefore believed that the construction and operation as well as the advantages of the present invention will be readily understood and appreciated by those skilled in the art.

What I claim as new is:

A mowing machine including a wheeled supported axle, a housing rotatably mounted upon the axle and provided with a casing section, a platform mounted upon the casing section, an engine supported on said platform, a belt wheel journaled upon the housing and disposed within the casing section, a second belt wheel operatively connected with the engine, said casing section provided with an opening, a belt trained over the wheels and extending through the opening, an extension of tubular formation provided on the housing, a cutting apparatus pivotally attached to the housing extension, a shaft in the extension connected with the cutting apparatus, and gearing operatively connecting the shaft with the first wheel.

In testimony whereof I affix my signature.

MARK HASTINGS.